(12) United States Patent
Iltus et al.

(10) Patent No.: US 11,516,340 B2
(45) Date of Patent: Nov. 29, 2022

(54) SYSTEM AND METHOD FOR PLAYING BUFFERED AUDIO OF A DROPPED TELEPHONE CALL

(71) Applicant: VONAGE AMERICA LLC, Holmdel, NJ (US)

(72) Inventors: Sagi Iltus, Hadera (IL); Eli Birger, Petach-Tikva (IL)

(73) Assignee: Vonage America LLC, Holmdel, NJ (US)

( * ) Notice: Subject to any disclaimer, the term of this patent is extended or adjusted under 35 U.S.C. 154(b) by 1139 days.

(21) Appl. No.: 14/609,654

(22) Filed: Jan. 30, 2015

(65) Prior Publication Data

US 2016/0227030 A1 Aug. 4, 2016

(51) Int. Cl.
*H04M 3/42* (2006.01)
*H04M 3/22* (2006.01)
*H04M 7/00* (2006.01)

(52) U.S. Cl.
CPC ..... *H04M 3/42221* (2013.01); *H04M 3/2236* (2013.01); *H04M 7/0084* (2013.01); *H04M 2201/36* (2013.01)

(58) Field of Classification Search
CPC ............ H04L 65/80; H04W 76/028; H04W 28/0268; H04W 12/06; H04W 36/02; H04W 36/023; H04W 36/14
USPC ........................................ 370/428
See application file for complete search history.

(56) References Cited

U.S. PATENT DOCUMENTS

| | | | | |
|---|---|---|---|---|
| 6,665,751 B1* | 12/2003 | Chen | ................ | H04N 21/23406 365/191 |
| 8,223,720 B1* | 7/2012 | Efrati | .................. | H04L 65/1083 370/331 |
| 8,331,545 B2* | 12/2012 | Lingafelt | ................ | H04W 4/16 379/202.01 |
| 8,335,576 B1* | 12/2012 | Bradshaw | ............... | H04L 65/80 700/94 |
| 2003/0067922 A1* | 4/2003 | Yoshitani | .......... | H04M 3/42221 370/394 |
| 2004/0207724 A1* | 10/2004 | Crouch | ............... | H04L 65/4038 348/14.09 |
| 2005/0068956 A1* | 3/2005 | Liao | .................... | H04L 12/4625 370/395.1 |
| 2006/0268912 A1* | 11/2006 | Read | .................. | H04N 21/4305 370/412 |
| 2007/0143800 A1* | 6/2007 | Salomons | .......... | H04N 21/4398 725/74 |
| 2010/0146085 A1* | 6/2010 | Van Wie | ............. | H04L 67/1059 709/220 |
| 2012/0057683 A1* | 3/2012 | Liik | .................... | H04L 65/1069 379/32.01 |

(Continued)

*Primary Examiner* — Will W Lin
(74) *Attorney, Agent, or Firm* — Moser Taboada (57) ABSTRACT

Methods and systems for replaying buffered audio of a telephone call are provided herein. In some embodiments, a method for replaying buffered audio of a telephone call, comprises buffering audio data associated with a telephone call when a quality of an established data connection decreases below a first threshold quality measure; playing the buffered audio data from the buffer; determining the quality of the established data connection exceeds a second threshold quality measure; and replaying the audio data from the buffer, wherein replaying the audio comprises modifying the playback rate of the buffered audio data during playback.

23 Claims, 5 Drawing Sheets

(56) References Cited

U.S. PATENT DOCUMENTS

2013/0150038 A1    6/2013  Efrati et al.
2016/0182191 A1*   6/2016  Rosenberg .............. H04L 65/80
                                                        370/392

* cited by examiner

SYSTEM AND METHOD FOR PLAYING BUFFERED AUDIO OF A DROPPED TELEPHONE CALL

BACKGROUND

Field

Embodiments of the present invention generally relate to systems and methods for buffering and playback of audio when recovering from a dropped or redirected telephone conversation.

Description of the Related Art

When a mobile telephony device is conducting a telephone call, such as a Voice over Internet Protocol (VoIP) call, the user of the mobile telephony device may move in and out of communication range of a wireless router or cell tower that the mobile telephony device has used to establish a data connection. During this time, the quality of the data connection may decrease to such a degree that the call may be disconnected. It would be desirable for the mobile telephony device to automatically re-establish a new data connection with the wireless router or cell tower, and for the call to continue without disruption to the user. Unfortunately, it is difficult to re-establish a data connection mid-call without the user being aware that the call has dropped.

Thus, there is a need for improved buffering and playback of audio when recovering from a dropped or redirected VoIP conversation.

SUMMARY

Methods and systems for replaying buffered audio of a telephone call are provided herein. In some embodiments, a method for replaying buffered audio of a telephone call, comprises buffering audio data associated with a telephone call when a quality of an established data connection decreases below a first threshold quality measure; playing the buffered audio data from the buffer; determining the quality of the established data connection exceeds a second threshold quality measure; and replaying the audio data from the buffer, wherein replaying the audio comprises modifying the playback rate of the buffered audio data during playback.

In some embodiments, a system for replaying buffered audio of a telephone call may include a quality monitoring module configured to monitor a quality of an established data connection of the telephone call; an audio buffering module configured to buffer audio data associated with a telephone call when a quality of an established data connection decreases below a first threshold quality measure and stop buffering audio when the quality of the established data connection increases above a second threshold quality measure; and an audio playback module configured to replay the audio data from the buffer wherein replaying the audio data comprises modifying the playback rate of the buffered audio data during playback.

In some embodiments, a non-transitory computer readable medium for replaying buffered audio of a telephone call is disclosed. The computer readable medium stores computer instructions that, when executed by at least one processor causes the at least one processor to perform the method for replaying buffered audio of a telephone call.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to systems and methods for buffering and replaying audio data (e.g., a voice conversation) associated with a telephone call. More specifically, embodiments of the present invention monitor the quality of a connection of a telephone call, and/or monitor the quality of audio data associated with the call. The connection may be a wired connection or a wireless connection. In some embodiments, the telephone call is a Voice over Internet Protocol (VoIP) call. When the quality of the data connection, or the audio data itself, decreases to a first predefined threshold quality measure, the incoming audio data associated with the call is buffered. While waiting for the quality of the connection to return above a second threshold quality measure, or while the call is being redirected and reconnected, the audio data associated with the call is replayed from the buffer. In some embodiments, while the audio is being replayed, the audio is sped up and the pitch of the audio is lowered. In some embodiments, silences and pauses may be removed. As such, the duration of the playback is less than the duration of the originally recorded audio, while the speed and pitch of the audio is not discernably changed. By the time the buffer is emptied, the call is reconnected and/or the quality of the wireless connection has reached the second threshold quality measure and the call resumes without the user being aware that a connection problem occurred.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
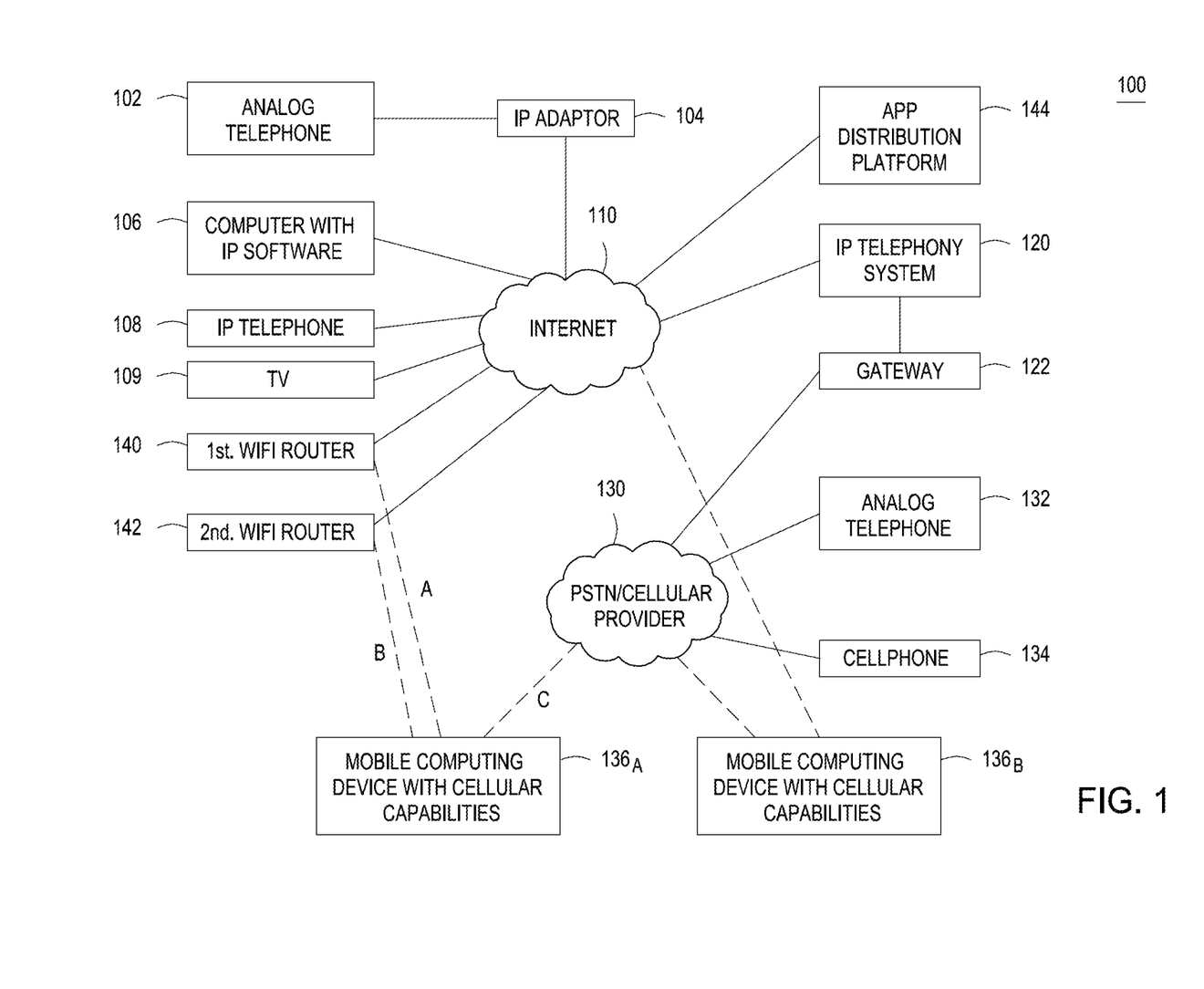
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a wireless local area network (WLAN) router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the wireless local area network (WLAN) based on the Institute of Electrical and Electronics Engineers' (IEEE) 802.11 and 802.13 standards.

Similarly, mobile computing device with cellular capabilities 136B may also be coupled to internet 110 and/or cellular service provider 130. In some embodiments, mobile computing device 136B may be connected to internet 110 via a wireless local area network (WLAN) based on the Institute of Electrical and Electronics Engineers' (IEEE) 802.11 and 802.13 standard connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
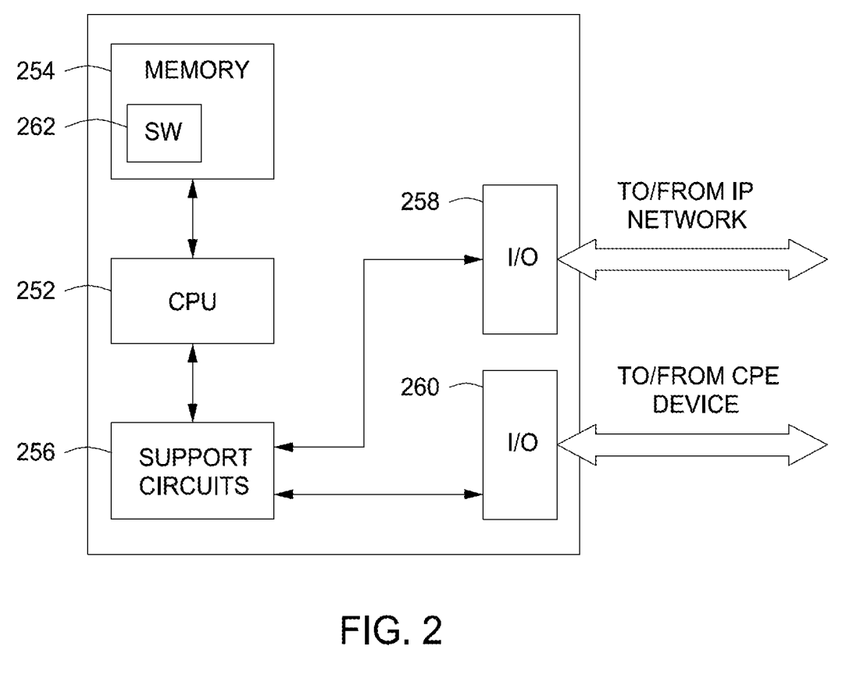
FIG. 2 a block diagram of various elements of a processor that forms part of an IP telephony system, in accordance with one or more embodiments of the invention.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the VoIP based telephony service 120. Further, a mobile telephony device 136 or some other IP telephony device could make use of one or more of the processors 250 to accomplish various functions.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment and to service provider agent equipment, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, or a mobile telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture The following description refers to IP telephony communications, or simply telephony communications. This phrase is intended to encompass any type of communication, including voice or video telephone calls, text messages and other forms of text-based, voice-based, or video-based messaging, as well as other forms of communications. Although the following examples may refer to a "call" or a "telephone call," for ease of reference, clarity and brevity, the systems and methods described may also be used to accomplish other forms of communications.

Figure 3:
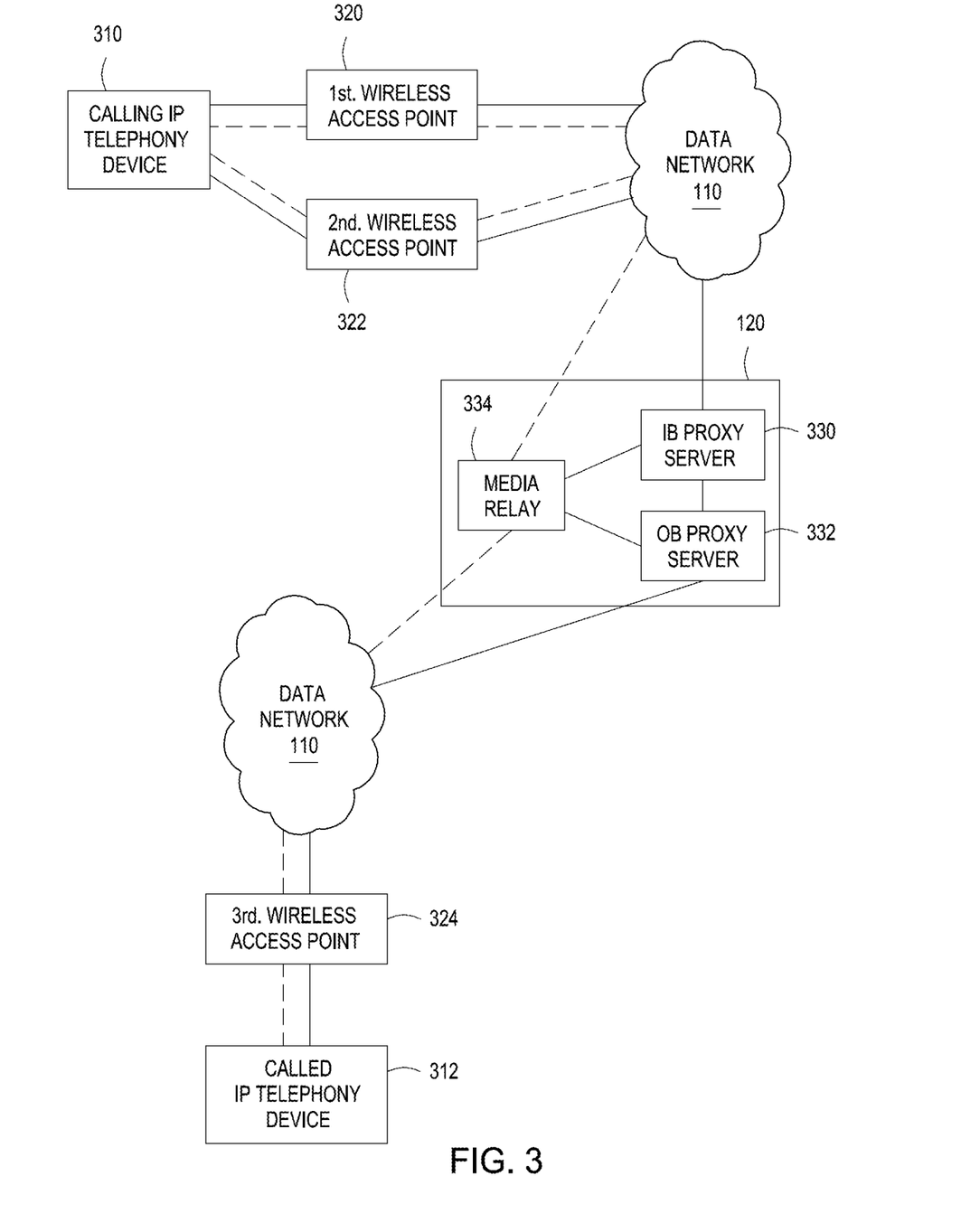
FIG. 3 is a block diagram illustrating the path that data packets bearing call setup signaling and the media of a telephone call traverse from a first telephony device to a second telephony device, in accordance with one or more embodiments of the invention.

FIG. 3 illustrates at least one embodiment of how a call is connected between a calling IP telephony device 310 and a called IP telephony device 312. Call setup signaling may include various types of IP signaling protocols, such as SIP, Real-Time Transport Protocol (RTP), Hyper Text Transfer Protocol (HTTP), and the like. In FIG. 3, the paths traversed by data packets bearing call setup signaling are illustrated by solid lines. The paths traversed by data packets bearing the media of a call are illustrated by dashed lines.

In an embodiment illustrated in FIG. 3, when the user of the calling IP telephony device 310 dials the telephone number of the called IP telephony device 312, call setup signaling is transmitted to the IP telephony system 120 via the data network 110. In this embodiment, the call setup signaling passes through a first data channel established between the calling IP telephony device 310 and the data network 110 through the first wireless access point 320. The call setup signaling is received by media relay 334 of the IP telephony system 120.

The called IP telephony device 312 is a mobile IP telephony device that establishes a data connection to a data network 110 through a third wireless access point 324. When a call is first setup between the calling IP telephony device 310 and the called IP telephony device 312, call setup signaling is routed from the inbound proxy server 330 and the outbound proxy server 332 of the IP telephony system 120 to the called IP telephony device 312 via the third wireless access point 324. Data packets bearing the media of the call are routed through the media relay 334 of the IP telephony system 120 directly to the third wireless access point 324, which delivers the data packets to the called IP telephony device 312. Likewise, data packets bearing the media of the call that are generated by the called IP telephony device 312 are routed through the third wireless access point 324 directly to the media relay 334 via the data network 110. Thus, data packets bearing the media of the call and data packets bearing the call setup signaling are routed to and from the called IP telephony device via the same wireless data connection to the called IP telephony device 312.

Although a call is established to a called telephony device 312 via a first path, the path may change partway through the call. This could occur if the calling mobile telephony device 310 is moving, and it moves out of range of a first wireless access point 320 and into range of a second wireless access point 322. When this occurs the call would be switched from the first wireless access point 320 to the second wireless access point 322 partway through the call. As the calling mobile telephony device 310 moves away from the first wireless access point 320, the quality of the wireless connection may diminish and the call may ultimately disconnect before the calling mobile telephony device 310 can connect to the second wireless access point 322.

Alternatively, calling mobile telephony device 310 may remain within range of a first wireless access point 320, but may move far enough away from the first wireless access point 320 that the quality of the connection diminishes or the call disconnects before the calling mobile telephony device 310 moves close enough to the first wireless access point 320 such that an acceptable quality connection is achieved.

When the calling mobile telephony device 310 moves in and out of range of an access point, the audio of the call is buffered and edited during playback. As such, the user of the calling mobile telephony device 310 may be unaware of any connection issues, as described in further detail with respect to FIG. 4 and FIG. 5, below.

Figure 4:
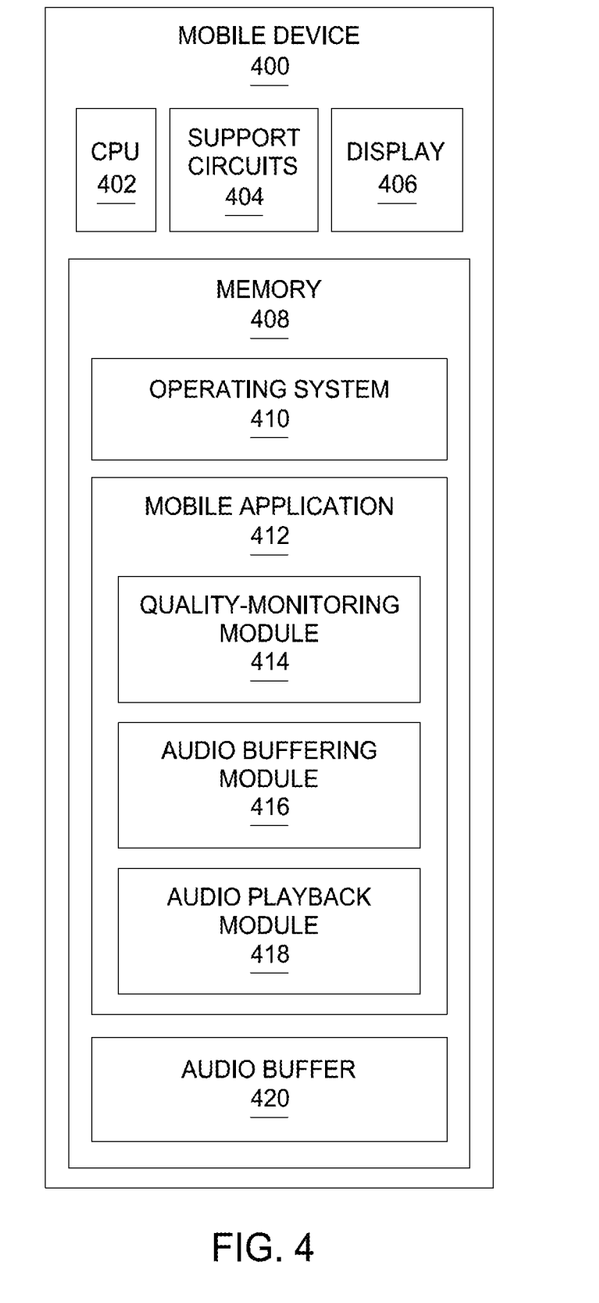
FIG. 4 illustrates some of the elements that are present in a mobile device, according to one or more embodiments of the invention.

FIG. 4 illustrates some of the elements that are present in a mobile device 400, according to one or more embodiments of the present invention. The mobile device 400 may include a computer with IP software 106, IP telephone 108, and/or mobile computing device with cellular capabilities 136A, 136B, and the like, as shown in FIG. 1.

The mobile device 400 comprises a Central Processing Unit (CPU) 402, support circuits 404, display 406, and a memory 408. The CPU 402 may comprise one or more commercially available microprocessors or microcontrollers that facilitate data processing and storage. The various support circuits 404 facilitate the operation of the CPU 402 and include one or more clock circuits, power supplies, cache, input/output circuits, and the like. The memory 408 comprises at least one of Read Only Memory (ROM), Random Access Memory (RAM), disk drive storage, optical storage, removable storage and/or the like. In some embodiments, the memory 408 comprises an operating system 410 and a mobile application 412. The operating system (OS) 410 generally manages various computer resources (e.g., network resources, file processors, and/or the like). The operating system 410 is configured to execute operations on one or more hardware and/or software modules, such as Network Interface Cards (NICs), hard disks, virtualization layers, firewalls and/or the like. Examples of the operating system 410 may include, but are not limited to, LINUX, MAC OSX, BSD, UNIX, MICROSOFT WINDOWS, IOS, ANDROID and the like.

The mobile application 412 may include a quality-monitoring module 414, an audio buffering module 416, and an audio playback module 418. In some embodiments, the mobile application 412 may be an over-the-top (OTT) telecommunication application as described above. The audio buffering module 416 is configured to create audio buffer 420 of the incoming audio data ("audio") associated with the VoIP call when the quality of the wireless data connection, or the audio data, decreases or the call disconnects. The audio may be played back on the user's device while the call is reconnecting such that the user is unaware of any disruption of the call.

The quality-monitoring module 414 monitors the quality of a wireless data connection between the mobile device 400 and a wireless access point for an established VoIP call. In some embodiments, the audio quality may be calculated on a scale of, for example 1 to 10, where a reading between 6 and 10 may indicate good audio quality, a reading of 5 may indicate degraded quality, and a reading below 5 indicates poor quality. Changes in audio quality may result from network congestion, stepping out of range of a wireless connection, and the like that causes the signal quality to lessen and the audio to be degraded. In some embodiments, the audio quality may be measured by relaying the received audio packet on mobile device 400 back to the device from which it originated and compare the audio quality of the received packet and the original packet to determine whether the audio quality has degraded below a first predefined level.

When the quality of the audio data decreases to a first predefined threshold quality measure, for example 3 out of 10, the audio buffering module 416 introduces an artificial latency into the incoming audio and stores the audio in audio buffer 420. In some embodiments, the artificial latency is created by slowing down the audio by a factor, for example of 0.8 times that of the original speed. For example, if an audio packet contains 20 ms of audio data, the audio may be stretched to 25 ms. In addition, the pitch of the audio may be adjusted to compensate for the decreased speed. In some embodiments, the artificial latency is created using artificial silence, such that if there is silence in the audio (i.e., no talking), the actual pause or silence between utterances is increase; for example two seconds of recorded silence could be stored for each one second of real silence. The latency provides time for enough audio to be buffered and replayed while the quality of the wireless connection is being restored to a level above the first threshold quality measure, whether improved quality is due to the mobile device 400 moving within range of the wireless access point or the call being reconnected via a same or different wireless access point.

While waiting for the quality of the connection to return above the threshold quality measure, or while the call is being redirected and reconnected, the audio data associated with the call is replayed from the audio buffer 420. During audio playback, the call quality may continue to fluctuate. When the call quality is below the first threshold quality measure, the audio playback module 418 plays the audio from audio buffer 420 as it was recorded with the artificial latency. When the call quality is above a second threshold quality measure, for example, 5 out of 10, the audio playback module 418 plays the audio from the audio buffer 420 with the artificial latency removed and at a faster rate. Similarly, in the event the call disconnects, if the disconnection time is expected to be short, the audio playback module 418 may play the audio from the audio buffer 420 with the artificial latency removed and at a faster rate, while the call is being reconnected. If the disconnection time is expected to be long, the audio playback module 418 may play the audio from the audio buffer 420 with the artificial latency included while the call is being reconnected. If the disconnection time is not expected to be significantly long or short, the audio playback module 418 may play the audio from audio buffer 420 with the artificial latency removed, but not at a faster speed, while the call is being reconnected.

The audio playback module 418 removes silences contained in the audio, while decreasing the pitch of the audio during playback, thereby reversing the audio modifications performed when the audio was stored. Removing the silences allows the audio in the audio buffer 420 to be replayed in less time than the duration of the original incoming audio, thereby reducing latency during playback. As such, in the few seconds it takes to re-establish the disconnected call, the user continues to hear the incoming audio as if it were in real-time and the user may be unaware of any connection issues on the call.

In the event the call returns to a quality above the second predefined quality measure before all of the audio in the audio buffer 420 has been played, the audio playback module 418 may continue to buffer the incoming audio, while replaying the buffered audio at a faster speed. For example, the audio playback module 418 may increase the playback speed by a factor of 1.1, for example, so the audio is played at a faster rate than it is received. Although incoming audio is being buffered, the audio in the buffer is played back at a faster speed than the incoming audio, thereby decreasing and eventually emptying the buffer.

In the event two or more mobile devices 400 participating in the VoIP call experience connection issues, each device buffers the audio of the call, the audio playback module 418 of each mobile device 400 simply replays the audio in the audio buffer 420 at the lower pitched playback with silences removed as described above and the conversation continues.

Figure 5:
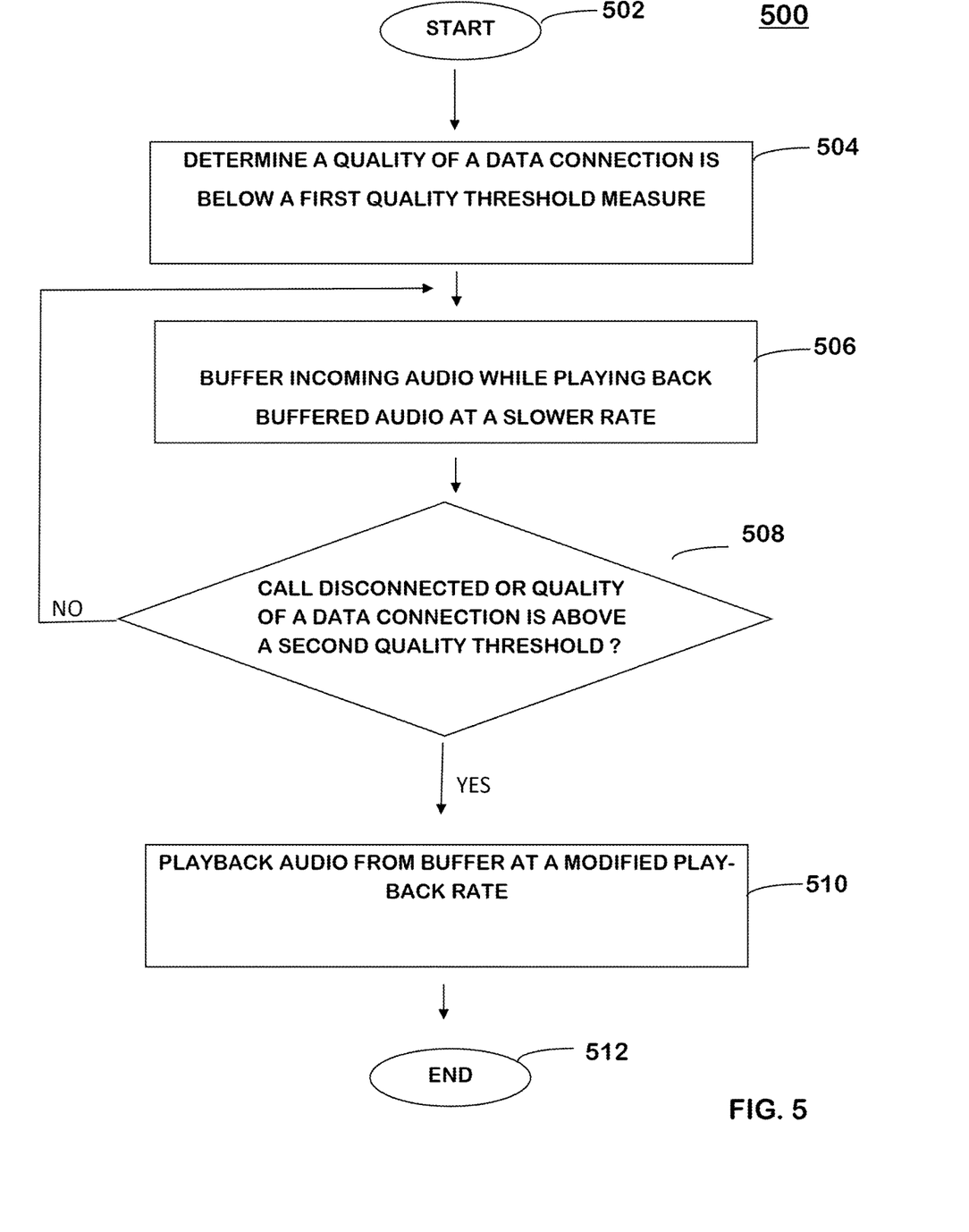
FIG. 5 depicts a flow diagram of a method for playback of audio when recovering a temporarily dropped conversation of a conversation, according to one or more embodiments of the invention.

FIG. 5 depicts a flow diagram of a method 500 for playback of audio when recovering a temporarily dropped conversation of a voice over Internet protocol (VoIP) conversation, according to one or more embodiments of the subject invention. Method 500 is invoked after a VoIP call has been established. The method 500 starts at step 502 and proceeds to step 504.

At step 504, the quality-monitoring module 414 determines that the audio quality of a wireless data connection used to establish the VoIP call has degraded. The audio quality of a call fluctuates due to congestion or when a mobile device begins to move away from a wireless access point. The quality slowly decreases and eventually, may drop the VoIP call if the mobile device moves out of range of the wireless access point. Quality readings are determined for the call. For example, a quality reading of 6 out of 10 may be an acceptable quality. A reading of 4 or 5 may be a degraded quality. A first predefined threshold is defined at which the quality of the wireless connection is unacceptable, for example a quality reading of 3 or less on a scale of 1 to 10. When the quality of the wireless connection reaches the threshold, for example, when the quality decreases below a level of 3 out of 10, the method 500 proceeds to step 506.

At step 506, the audio buffering module 416 begins to buffer the incoming audio of the VoIP call. The audio buffering module 416 creates an audio buffer to hold the incoming audio. In some embodiments, the buffer is created to be a size that holds a predefined number of seconds of audio, for example, three (3) seconds. In some embodiments, the buffer size is not predefined, but rather, the number of seconds of audio to be buffered in based on historic disconnection statistics of the current location. Telemetry data is gathered for each call by user of the service provider. For example, call duration, average quality, packets lost, whether the call was disconnected and reconnected, time to reconnect, and the like are gathered by the service provider. The telemetry information is stored in a service provider server. The telemetry information is used to, based on a user's network location and access point name, or carrier name, to calculate the possibility of disconnection, as well as the possible length of the disconnection. When a call is connected, each user device may be provided an estimate for an optimized size of a buffer based on the possibility of disconnection, and the possible length of the disconnection. For example, if at the current location, the reconnection time is statistically very fast, for example, 2 seconds, the buffer may be created to hold 2 seconds of audio. Conversely, if the reconnection time is statistically slower, for example, reconnection time is 5 seconds, the buffer may be created to hold 5 seconds of audio.

The audio is buffered until the audio quality is determined to be above a second predefined threshold, for example, 5 out of 10. When the quality of the wireless connection is below the first predefined threshold, the audio buffering module 416 creates latency in the incoming audio of the call. Alternatively, latency may be introduced during playback. The latency delays the audio in order to have enough audio to playback while waiting for the VoIP call to be re-established (or the quality reaches above the second predefined threshold). As the audio is buffered, it is also played back with the created latency. As such, as long as the audio quality remains below the first predefined threshold, the buffered audio continues to be played at the slow rate.

At step 508, the quality-monitoring module 414 determines whether the call has disconnected or the quality of the audio has improved above the second predefined threshold quality measure. If the call has not disconnected and the quality remains below the first predefined threshold quality measure, the audio buffering module 416 continues to create latency in the buffered audio, while continuing to playback the audio at the slower rate. However, if the call has disconnected or the quality reaches above the second predefined threshold, the method 500 proceeds to step 510.

At step 510, the audio playback module 418 begins to playback the audio in the audio buffer. Although latency was created in the audio when it was received, if based on telemetry data, the reconnection time at the current location is short, latency may be removed when the audio is played. Silences or pauses in the audio may also be removed and/or the playback speed may be increased. In some embodiments, only a portion of silences or pauses in the audio are discarded. For example, if there are 4 seconds of audio and 1 second of silence, then only the 4 seconds of audio might be played. The incoming audio is buffered while the buffered audio is played at a faster, but imperceptibly increased speed. For example, the audio playback module 418 may increase the playback speed by a factor of 1.1 so that the buffer is emptying faster than it is being loaded. Although incoming audio is being buffered, the audio in the buffer is played back at a faster speed than the incoming audio, thereby decreasing and eventually emptying the buffer. The rate of increase and/or portion of silence or pauses in audio removed may be determined based on telemetry information, such as call duration, average quality, packets lost, whether the call was disconnected and reconnected, time to reconnect, and the like.

Alternatively, if based on the telemetry data, the reconnection time is long, the audio playback may include the latency and/or be played at a slower rate in order to allow time for the call to reconnect. In addition, silences or pauses may be lengthened during playback to provide additional time for the call to reconnection. For example, the audio playback module 418 may decrease the playback speed by a factor of for example, 0.8 so that the buffer is emptying slowly.

In some embodiments, silence is detected based on packet size. Audio recording uses a variable bitrate. As a result, packets that contain silences are significantly smaller than packets containing audible voices. An audio packet of a packet size that is, for example, less than 5% of a normal audio packet is determined to contain silence and is discarded. In some embodiments, silence is determined based on the volume of the audio. If the volume of the audio is below a predefined threshold, it is determined to be silence and is discarded.

In some embodiments, the steps of method 500 are performed by the mobile device 400. In some embodiments, monitoring the wireless connection may be performed by an IP network server, (e.g., media relay 334) using real-time transport control (RTCP) packets, which provide statistics regarding quality of service (QoS) of the audio data, including, but not limited to jitter, packet loss, and the like. The media relay may also detect a poor connection based on, for example a 3G signal, or a geographical location. For example, suppose mobile device A and mobile device B are on a call. In such embodiment, when the media relay detects that the QoS begins to decrease for mobile device A, the media relay sends an instruction to the mobile device A to begin buffering the incoming audio data (and introduce the artificial latency). In some embodiments, the media relay may send the instruction to both mobile device A and mobile device B to buffer the incoming audio and introduce latency. In some embodiments the media relay may send the instruction to mobile device A to buffer the incoming audio and the media relay will buffer the incoming audio for mobile device B (audio from mobile device A). When mobile device A disconnects, mobile device A plays the buffered audio (from mobile device B). If mobile device B was instructed to buffer the incoming audio, mobile device B replays the buffered audio (from mobile device A). If the media relay buffered the audio for mobile device B, when mobile device A disconnects, the media relay transmits the buffered audio to mobile device B and the user of mobile device B may not be aware that connectivity with mobile device A was lost. In some embodiments, when the media relay determines that, for example mobile device A has disconnected, the media relay buffers the incoming audio from mobile device B. When mobile device A reconnects, the media relay sends the buffered audio to mobile device A. In some embodiments, when the call between mobile device A and mobile device B disconnects, both mobile device A and mobile device B record their outgoing audio in a second buffer. When the call reconnects, each mobile device's outgoing buffered audio is sent first, while the buffered incoming audio is playing at a faster speed with the latency removed. The method 500 ends at step 512.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example, but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for replaying buffered audio of a telephone call via a media relay, comprising:
receiving, by the media relay, call set up signaling and audio data of the telephone call;
buffering, by the media relay, the audio data associated with the telephone call when the media relay detects that a quality of an established data connection decreases below a first threshold quality measure;
playing, by the media relay, the buffered audio data from a buffer;
determining, by the media relay, that the quality of the established data connection exceeds a second threshold quality measure; and
replaying, by the media relay, the audio data from the buffer, wherein replaying the audio comprises modifying a playback rate of the buffered audio data during playback.

2. The method of claim 1, wherein the quality of the established data connection exceeds the second threshold quality measure after the telephone call disconnects and reconnects.

3. The method of claim 1, wherein playback stops when the buffer is emptied.

4. The method of claim 1, wherein playback prior to reaching the second threshold quality measure comprises a slowdown in the playback rate.

5. The method of claim 4, wherein slowing down the playback rate includes at least one of lengthening pauses and silences in the audio or reducing a playback speed by a predefined factor.

6. The method of claim 5, wherein the playback rate is based on telemetry data including at least one of average call quality, packets lost, or time to reconnect after a call disconnects.

7. The method of claim 1, wherein playback after reaching the second threshold quality measure comprises speeding up the playback rate.

8. The method of claim 7, wherein speeding up the playback rate includes at least one of removing pauses and silences in the audio or increasing the playback speed by a predefined factor.

9. The method of claim 8, wherein the playback rate is based on telemetry data including at least one of average call quality, packets lost, or time to reconnect after a call disconnects.

10. The method of claim 1, wherein the buffer size is based on historic disconnection statistics at a current location and based on telemetry data including at least one of call duration, average quality, packets lost, whether a call was disconnected and reconnected, or a reconnection time.

11. The method of claim 1, wherein replaying the audio data from the buffer further comprises reducing a pitch of the audio during playback.

12. A system for replaying buffered audio of a telephone call via a media relay, comprising:
a) at least one processor;
b) at least one input device; and
c) at least one storage device storing processor executable instructions which, when executed by the at least one processor, perform a method including:
receiving, by the media relay, call setup signaling for the telephone call;
monitoring, by the media relay, a quality of an established data connection of the telephone call;
buffering, by the media relay, audio data associated with a telephone call when a quality of an established data connection detected by the media relay decreases below a first threshold quality measure and stop buffering audio when the quality of the established data connection increases above a second threshold quality measure; and
replaying, by the media relay, the audio data from a buffer wherein replaying the audio data comprises modifying a playback rate of the buffered audio data during playback.

13. The system of claim 12, wherein the quality of the established data connection exceeds the second threshold quality measure after the telephone call disconnects and reconnects.

14. The system of claim 12, wherein the audio playback module is further configured to stop playback when the buffer is emptied.

15. The system of claim 12, wherein playback prior to reaching a second threshold quality measure comprises a slowdown in the playback rate.

16. The system of claim 15, wherein slowing down the playback rate includes at least one of lengthening pauses and silences in the audio or reducing a playback speed by a predefined factor.

17. The system of claim 16, wherein the slowdown rate is based on telemetry data including at least one of average call quality, packets lost, or time to reconnect after a call disconnects.

18. The system of claim 12, wherein playback after reaching the second threshold quality measure comprises speeding up the playback rate.

19. The system of claim 18, wherein speeding up the playback rate includes at least one of removing pauses and silences in the audio or increasing the playback speed by a predefined factor.

20. The system of claim 19, wherein the speed at which the playback rate is increased is based on telemetry data including at least one of average call quality, packets lost, or time to reconnect after a call disconnects.

21. The system of claim 12, wherein the buffer size is based on historic disconnection statistics at a current location and based on telemetry data including at least one of call duration, average quality, packets lost, whether a call was disconnected and reconnected, or a reconnection time.

22. The system of claim 12, wherein replaying the audio data from the buffer further comprises reducing a pitch of the audio during playback.

23. A non-transitory computer readable medium for storing computer instructions that, when executed by at least one processor causes the at least one processor to perform a method for replaying buffered audio of a telephone call via a media relay, comprising:
    receiving, by the media relay, call set up signaling and audio data of a telephone call;
    buffering, by the media relay, the audio data associated with the telephone call when the media relay detects that a quality of an established data connection decreases below a first threshold quality measure;
    playing, by the media relay, the buffered audio data from a buffer;
    determining, by the media relay, the quality of the established data connection exceeds a second threshold quality measure; and
    replaying, by the media relay, the audio data from the buffer, wherein replaying the audio comprises modifying a playback rate of the buffered audio data during playback.

* * * * *